United States Patent [19]
Platt et al.

[11] Patent Number: 5,233,406
[45] Date of Patent: Aug. 3, 1993

[54] RECESSED CENTER POST MOUNTED DITHER SYSTEM

[75] Inventors: William P. Platt, Columbia Heights; Joseph E. Killpatrick, Minneapolis, both of Minn.

[73] Assignee: Honeywell Inc., Minneapolis, Minn.

[21] Appl. No.: 793,931

[22] Filed: Nov. 13, 1991

[51] Int. Cl.⁵ .............................. G01C 19/70
[52] U.S. Cl. .................... 356/350; 372/94
[58] Field of Search ................. 356/350; 372/94

[56] References Cited

U.S. PATENT DOCUMENTS

| | | |
|---|---|---|
| 3,467,472 | 9/1969 | Killpatrick ............... 372/94 X |
| 3,469,922 | 9/1969 | Coccoli et al. ........... 356/350 |
| 4,477,188 | 10/1984 | Stiles et al. ............. 356/350 |
| 4,751,718 | 6/1988 | Hanse et al. ............. 372/94 |

FOREIGN PATENT DOCUMENTS

WO86/01287 2/1986 World Int. Prop. O. .......... 356/350

Primary Examiner—Vincent P. McGraw
Attorney, Agent, or Firm—Ronald E. Champion; Craig J. Lervick

[57] ABSTRACT

A method for attaching dither motors to a ring laser gyro block such that the dither motors do not induce a large amount of stress into the laser gyro block. Attachment is achieved by the use of a center post having a diameter substantially smaller than the size of the laser gyro block.

18 Claims, 2 Drawing Sheets

RECESSED CENTER POST MOUNTED DITHER SYSTEM

FIELD OF THE INVENTION

The following invention provides a structure for mounting a ring laser gyroscope block within a housing. The structure of the present invention also allows the block to be rotationally oscillated within the housing.

BACKGROUND OF THE INVENTION

A ring laser gyroscope is a device used to sense inertial rotation. The gyroscope is a common component in any navigation system, including systems used on aircraft, space craft, watercraft, etc.

Ring laser gyroscopes or gyros are well known in the art and are specifically described in U.S. Pat. No. 3,373,650 to Killpatrick, and U.S. Pat. No. 3,390,606 to Podgorski.

A common problem in ring laser gyros is lockin. Lockin occurs when the gyro sits idle causing the two laser beams within the gyro to lock together and operate at the same frequency. To avoid lockin, an oscillatory input is provided to the gyro. This oscillation is provided by a dither means.

Attaching the dither means to the laser gyroscope block causes problems that seriously affect the operation of the gyro. Differences in the thermal characteristics of the laser block and the mounting structure creates stresses in the laser block.

The laser gyro block is typically made out of glass or some other material having a very low coefficient of thermal expansion. However, the dither motor is typically made of aluminum or metal having a higher coefficient of thermal expansion. It is not feasible to attempt to make the dither motor out of a glass due to the breaking characteristics of glass, nor is it feasible to make the gyro block of metal. Therefore it is necessary to create a configuration for connecting the dither motor and the gyro block that reduces the stress caused by the mismatch in coefficient of thermal expansions.

In the past dither motors have been attached to ring laser gyroscopes in a number of ways. In smaller gyroscopes the dither motor was clamped to the laser gyro block. In larger gyroscopes an internal dither motor is placed in the center of the block and attached thereto. In other configurations, the dither means is attached to the block by a compression fit. Each of these attachment methods creates stresses in the block due to different rates of thermal expansion.

Prior art has used complicated dither motor geometries to alleviate the problems previously mentioned. This solution includes the creation of a void between the laser block and the dither motor to allow for thermal expansion without placing any stress on the gyro block.

SUMMARY OF THE INVENTION

An object of the present invention is to provide a structure for attaching a laser block to a dither means that reduces stress caused by thermal expansion of different parts.

A further object of the present invention is to provide a structure for attaching a laser gyro block to a mounting structure while also allowing the laser gyro block to be rotationally oscillated in relation to the mounting structure.

The structure of the present invention utilizes a small center post to connect the dither motor and the gyro block. Since the center post is small, the total amount of thermal expansion is reduced, thus also reducing stress in the block.

An aperture is placed through the center of the laser gyro block. The aperture has a very small diameter in relation to the size of the laser gyro block.

The center post passes through the aperture in the center of the laser gyro block and attaches thereto. This attachment can be made in a number of ways including adhesive, press fitting, heat bonding, clamping, etc. The post is long enough so portions extend from the surface of the laser gyro block.

The dither motors are attached to the same center post on the portions extending from the surface of the laser gyro block. The dither motors may also be attached to the post by a variety of means including an adhesive, press fitting, heat bonding, clamping, etc.

Since the center post is very small in relation to the size of the laser gyro block stresses caused by thermal expansion are greatly reduced. Additionally, the post is an uncomplicated part which is easy to fabricate.

BRIEF DESCRIPTION OF THE DRAWING

The present invention may be better understood by reading the following description of the preferred embodiment in conjunction with the following drawing in which.

DESCRIPTION OF THE PREFERRED EMBODIMENT

Figure 1:
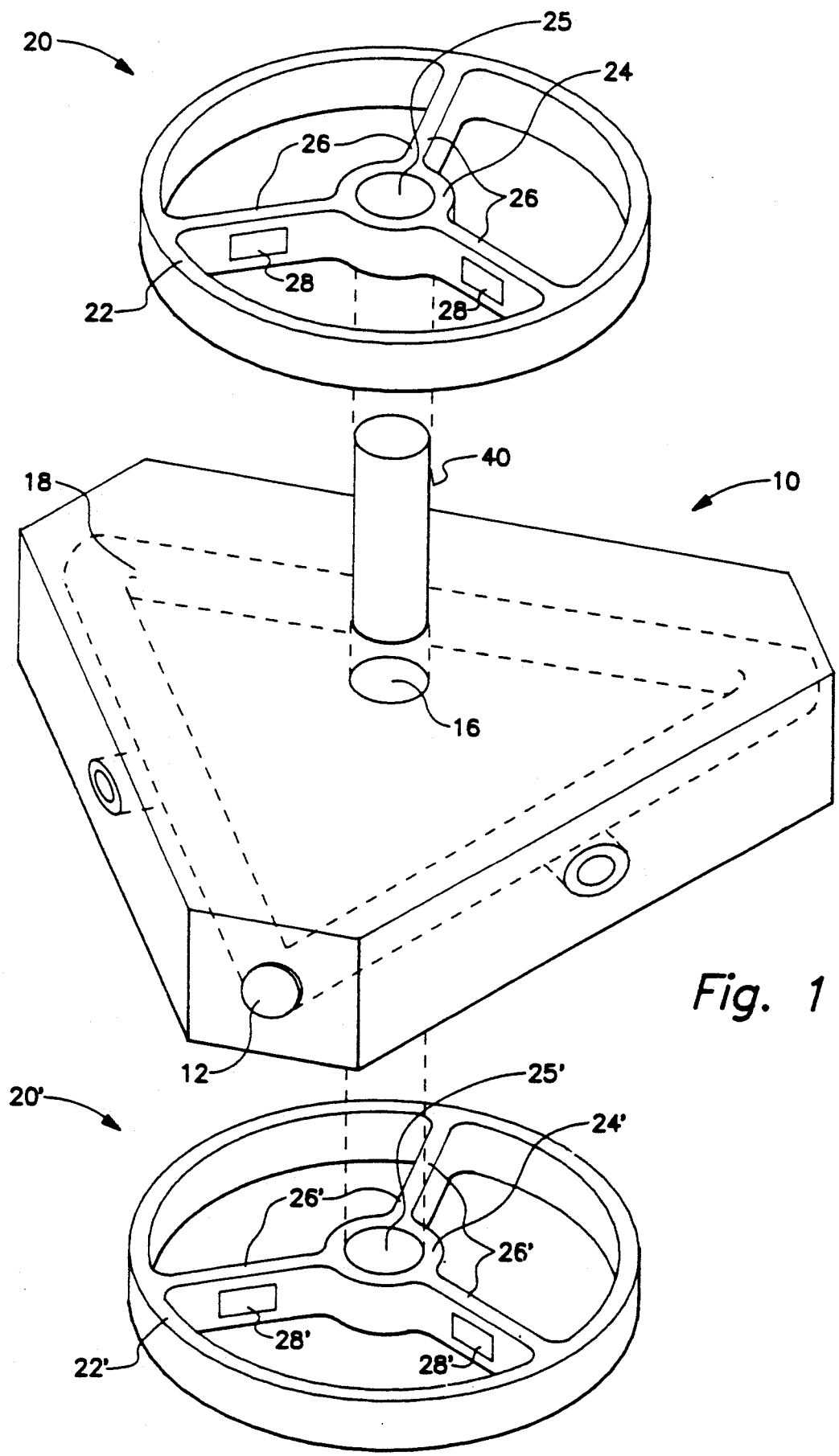
FIG. 1 is an exploded view showing the different parts of the invention as well as their relationships to one another.
Figure 2:
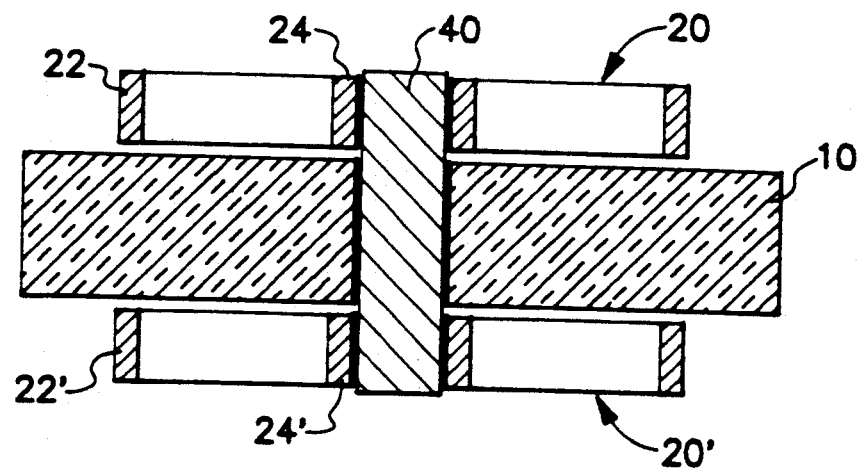
FIG. 2 shows a cross sectional diagram of the ring laser gyro again showing the inter-relationships between the different parts.

Referring to FIG. 1 and FIG. 2 a gyroscope utilizing the principles of the preferred embodiment has three basic elements: a laser gyro block 10, dither motors 20 and 20', and a center post or shaft 40.

The laser gyro block 10 is capable of supporting two counter propagating light beams. In the present embodiment the light beams are created by a gas discharge laser. The light beams travel in a cavity 18 in the shape of a closed polygon. In the present embodiment the cavity is triangular shaped, however this cavity could be in the shape of any closed polygon. On each apex of the cavity 18, mirrors 12 are mounted. These mirrors 12 cause the light beams to be reflected around the cavity 18. Within the cavity 18, one light beam travels in a clockwise direction while the other light beam travels in a counter clockwise direction. The light beams travel in a plane that is perpendicular to the mirrors 12. This plane shall hereinafter be referred to as the lasing plane.

An aperture or bore 16 exists in the center of the laser block 10. This bore 16 is perpendicular to the lasing plane.

The dither means or dither motor 20 provides a rotationally oscillating input to the laser block 10. The dither motor 20 of the present embodiment is configured to have an outer member 22 and a central member 24 connected by a plurality of resilient members or spokes 26. Central member 24 is substantially cylindrical with aperture 25 passing therethrough. Aperture 25 is aligned parallel with the cylindrical walls of central member 24. Outer member 22 is configured as a hub or rim surrounding central member 24. Spokes 26 have at least one piezoelectric element 28 attached thereto. Piezoelectric elements 28 expand and contract when excited by an electrical current. When piezoelectric elements 28 are excited by an AC current, oscillating force is developed against the spokes 28. This oscillating force causes the inner rim 24 of the dither motor 20 to oscillate in a circular fashion with respect to the outer rim 22.

A second dither motor 20' is attached to the post on the opposite side of the laser block. All similar parts are designated by primes.

A center post or shaft 40 is used to attach dither motors 20 and 20' to laser block 10. Center post 40 is shown in FIG. 1 to be configured as a right circular cylinder. It is understood that center post 40 could be configured in a multitude of shapes including but not limited to cone-shaped, rectangular, or an oval cylinder. Center post 40 passes through aperture 16 in gyro block 10 such that a portion of shaft 40 extends from both the top and bottom surface of laser block 10. Central members 24 and 24' of dither motors 20 and 20' are connected to shaft 40 on the portions extending from the surface of laser block 10. Shaft 40 is attached to both laser block 10 and dither motors 20 and 20' through the use of an adhesive, press fitting, heat bonding or clamping. In the preferred embodiment an epoxy adhesive is used. It is important that there is no direct contact between dither motors 20 and 20' and gyro block 10. In alternate embodiments of the present invention the means for connecting dither motors 20 and 20' and gyro block 10 could be a number of different things. For example, a press fit, heat bond, or clamp could be used.

During operation dither motors 20 and 20' will be mounted to a solid surface. The outer rim 22 of the dither motor 20 is mounted to a mounting surface. When the dither motor operates, the inner rim 24 will oscillate with respect to the outer rim 22 causing the laser block 10 to oscillate along with it. This introduces an oscillating input to the laser block.

The center post 40 is very small in relation to the laser block 10 and constructed of a different material. The laser block 10 is constructed of a glass material having a very low coefficient of thermal expansion while the center post 40 is constructed of a metal having a higher coefficient of thermal expansion. The differences in the coefficients of thermal expansion could create very large stresses when the temperature of these parts is changed. However, because of the small size of the center post 40 stresses caused by the differences in the coefficients of thermal expansion are very minimal and therefore do not effect the operation of the ring laser gyro. For example, a laser block 10 having path length 18 of approximately 2.0", post 40 would have a diameter of 0.5" to 0.1". In the case of a gyro block 10 with a path length of 0.8", post 40 would have a diameter of 0.3" to 0.1". The small size of the center post 40 allows for only a small amount of expansion. This expansion is not large enough to create a large amount of stress in block 10.

Additionally, as seen in FIG. 2, the epoxy joints connecting center shaft 40 and laser gyro block 10 are very small. As is the case with center shaft 40, very little expansion will occur thus reducing problems created when the epoxy has a different coefficient of thermal expansion from the block or the shaft.

While it is desired to use a small center shaft 40, it can not be too small. During dither operation center shaft 40 and laser gyro block 10 will be rotationally oscillating, thus creating a shear force in the connection between these two elements. Center shaft 40 must be large enough to provide the required shear strength in the connection between itself and laser gyro block 10. Therefore, based on the concerns of thermal expansion, and connection shear strength, an optimum shaft radius can be determined.

Figure 3:
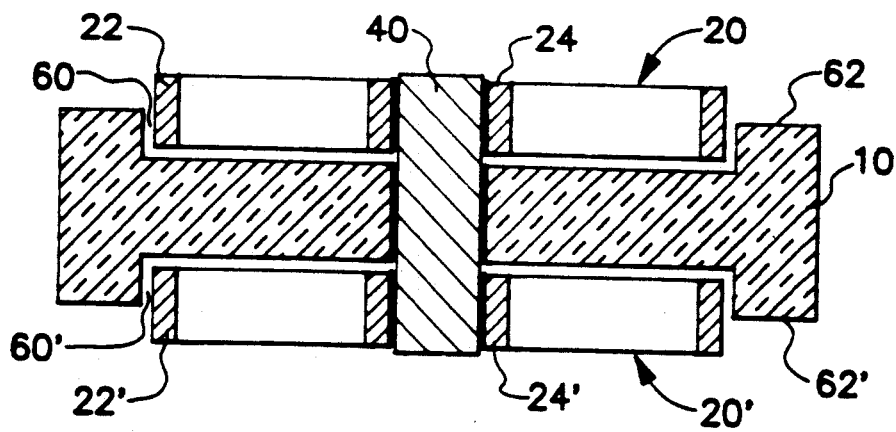
FIG. 3 is a cross sectional diagram of the ring laser gyro with the dither motors recessed into a counterbore in the laser block.

Referring to FIG. 3 the size of the ring laser gyro can be greatly reduced by recessing dither motors 20 and 20' at least partially into laser block 10. To accomplish this size reduction, a counterbores 60 and 60' is established in the sides 62 and 62' of block 10. Counterbores 60 and 60' are coaxially aligned with aperture 16 configured to receive at least a portion of dither motor 20 and 20'.

Having illustrated and described the principles of the invention in the preferred embodiment it should be apparent to those skilled in the art that the invention can be modified in arrangement and detail without departing from such principles. We claim all modifications coming within the spirit and scope of the following claims.

We claim:
1. A laser gyro assembly, comprising:
   a laser block having a gas filled cavity therein, said laser block including means for permitting at least one laser beam propagating about an optical closed loop path within said laser block, said block including an aperture passing there through;
   at least one dither means having an central member, an outer member, and resilient means for connecting said central member to said outer member, said dither means operative for rotational oscillating said outer member relative to said central member, said outer member adapted to be attached to a support structure; and
   a post positioned within at least a portion of said aperture and rigidly attached to said laser block, said post further rigidly attached to said dither means central member for permitting said laser block to rotate in unison with said dither means central member relative to said dither means outer member, said post having a diameter substantially smaller than the dimensions of said laser block.

2. The laser gyro assembly of claim 1 wherein said laser block includes opposite planar surfaces perpendicular to a central axis of said aperture, said laser block further including a counterbore coaxially aligned with said aperture; and
   wherein said dither means outer member is configured as an annular rim centrally positioned about said central member, and
   wherein at least a portion of said outer rim member is positioned within said counterbore and said outer rim and said post are coaxially aligned with said aperture.

3. The laser gyro assembly of claim 1 wherein:
   said dither means central member contains a aperture passing there through; and
   said center post passes at least partially through said aperture and is rigidly attached thereto.

4. The laser gyro assembly of claim 1 wherein said laser beams propagate around a closed polygon path.

5. The laser gyro assembly of claim 1 wherein said resilient members have piezoelectric members mounted thereon to cause said resilient members to flex when said piezoelectric members expand and contract.

6. The laser gyro assembly of claim 4 wherein said closed polygonal path is triangular in shape having three legs, said center post has a diameter that is 5 to 30 percent of the size of a leg of said triangular path.

7. The laser gyro assembly of claim 1 wherein said post is attached to said laser block and said dither means by an adhesive.

8. The laser gyro assembly of claim 7 wherein said adhesive is an epoxy.

9. The laser gyro assembly of claim 1 wherein said post is configured in the shape of a right circular cylinder.

10. A dither suspension mechanism for transmitting circumferential motion about an axis to a driven member, said dither suspension mechanism comprising:
   dither means having an central member, an outer member, and resilient means connecting said outer member to central member, said dither means operative for causing said central member to rotationally oscillate with respect to said outer member, said outer member having means for attaching said outer member to a support structure; and
   a post rigidly attached to said central member of said dither means, said post further attached to said driven member by passing said post into an aperture in said driven member and rigidly attaching said post to walls of said aperture, said post having a diameter substantially smaller than the size of said driven member.

11. The dither suspension mechanism of claim 10 wherein:
   said central member of said dither means has an aperture there through; and
   said post is inserted at least partially into said aperture in said dither means central member and is rigidly attached to walls of said aperture in said dither means central member.

12. The dither suspension mechanism of claim 10 wherein said post is attached to said walls of said aperture and said dither means central member by an epoxy.

13. The dither suspension mechanism of claim 11 wherein said post is rigidly attached to said aperture in said driven member and said aperture in said dither means central member by an epoxy.

14. The dither suspension mechanism of claim 10 wherein said driven member has opposite surfaces perpendicular to said axis of circumferential motion, said surfaces having counterbores coaxially aligned with said aperture for receiving at least a portion of said dither means.

15. The dither suspension mechanism of claim 10 wherein said dither means has piezoelectric members on said resilient means to cause said resilient means to oscillate in response to expansion and contraction of said piezoelectric members.

16. The dither suspension mechanism of claim 11 wherein said driven member has opposite surfaces perpendicular to said axis of circumferential motion, said surfaces having counterbores coaxially aligned with said aperture for receiving at least a portion of said dither means.

17. The dither suspension mechanism of claim 10 wherin said post is configured in the shape of a substantially right circular cylinder.

18. A laser gyro assembly, comprising:
   a laser block having a gas filled cavity therein, said laser block including means for permitting at least one laser beam propagating about an optical closed looped path within said laser gyro block, said block including an aperture passing there through positioned within said closed looped optical path, said block having opposite planar surfaces perpendicular to a central axis of said aperture, said block further having counterbores therein coaxially aligned with said aperture beginning at said planar surfaces and extending inward therefrom;
   at least one dither means having a central member, an annular outer member, and resilient means for connecting said outer member and said central member, said dither means for rotational oscillating said outer member relative to said central member, said outer member adapted to be attached to a support structure, said central member having an aperture therein coaxially aligned with a central axis of said central member, said resilient means having piezoelectric members causing said resilient means to oscillate in response to expansion and contraction of said piezoelectric members; and
   a right circular cylindrical post positioned within at least a portion of said aperture in said laser block and rigidly attached to said laser block, said post further position within at least a portion of said aperture in said dither means central member and rigidly attached to said dither means central member for permitting said laser block to rotate in unison with said dither means central member, said post having a diameter substantially smaller than the dimensions of said laser block.

* * * * *